United States Patent
McKenzie et al.

(10) Patent No.: US 11,625,780 B1
(45) Date of Patent: *Apr. 11, 2023

(54) TECHNIQUES FOR AUTOMATED CALL CROSS TRADE IMBALANCE EXECUTION

(71) Applicant: STATE STREET BANK AND TRUST COMPANY, London (GB)

(72) Inventors: Alan F. McKenzie, Surrey (GB); Mark Snyder, Wellesley, MA (US); Harsha Bhat, Redwood City, CA (US)

(73) Assignee: STATE STREET BANK AND TRUST COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,414

(22) Filed: May 28, 2021

Related U.S. Application Data

(63) Continuation of application No. 16/131,082, filed on Sep. 14, 2018, now Pat. No. 11,023,970, which is a
(Continued)

(51) Int. Cl.
  *G06Q 40/04* (2012.01)
  *G06Q 40/02* (2023.01)
  *G06Q 40/06* (2012.01)

(52) U.S. Cl.
  CPC ............ *G06Q 40/04* (2013.01); *G06Q 40/02* (2013.01); *G06Q 40/06* (2013.01); *G06Q 40/025* (2013.01)

(58) Field of Classification Search
  CPC ........ G06Q 40/04; G06Q 40/02; G06Q 40/06; G06Q 40/025
  See application file for complete search history.

(56) References Cited

U.S. PATENT DOCUMENTS

| | | | | |
|---|---|---|---|---|
| 6,016,483 A | * | 1/2000 | Rickard | G06Q 40/04 |
| | | | | 705/36 R |
| 6,826,545 B2 | * | 11/2004 | Kawashima | G06Q 20/10 |
| | | | | 705/40 |

(Continued)

FOREIGN PATENT DOCUMENTS

| | | | | | |
|---|---|---|---|---|---|
| GB | 2354608 | * | 9/1999 | ............ | G06F 17/60 |
| WO | WO-9946658 A2 | * | 9/1999 | ............ | G06Q 40/00 |
| WO | WO-2008109141 A1 | * | 9/2008 | ............ | G06Q 40/04 |

OTHER PUBLICATIONS

Foreign Exchange Committee: Tools for Mitigating Credit Risks in Foreign Exchange Transactions, Nov. 2010, pp. 1-6 (Year: 2010).*
(Continued)

*Primary Examiner* — Bijendra K Shrestha
(74) *Attorney, Agent, or Firm* — Goodwin Procter LLP

(57) ABSTRACT

Various embodiments are generally directed to techniques for automated call cross trade imbalance execution. Techniques described herein may provide an automated crossing solution for buy-side clients that limits position information to banks and individuals prior to setting a benchmark rate for foreign exchange. In some embodiments, clients may roll forward spot trades with a chosen counterparty bank, which is then sent to a centralized, automated, bank platform. Techniques described herein may offer a multi-bank platform solution that accepts trades, validates trades, performs credit checks, and executes trades in a manner that limits knowledge of position information prior to setting a benchmark rate. Further, proposed techniques include determining a trade imbalance and automatically executing the determined trade imbalance in a manner such that market impact is minimalized. In some embodiments, trade imbalances may be calculated on a bank-by-bank basis, thus allowing each bank to execute its own trade imbalance. Other embodiments are described.

21 Claims, 10 Drawing Sheets

Related U.S. Application Data continuation of application No. 14/664,732, filed on Mar. 20, 2015, now Pat. No. 10,102,578.

(60) Provisional application No. 61/994,711, filed on May 16, 2014, provisional application No. 61/969,791, filed on Mar. 24, 2014.

(56) References Cited

U.S. PATENT DOCUMENTS

| | | | | |
|---|---|---|---|---|
| 7,024,386 | B1* | 4/2006 | Mills | G06Q 40/00 705/37 |
| 7,430,533 | B1* | 9/2008 | Cushing | G06Q 40/04 705/37 |
| 7,788,161 | B2* | 8/2010 | Burkhardt | G06Q 40/025 705/37 |
| 8,078,521 | B1* | 12/2011 | Williams | G06Q 40/04 705/37 |
| 2002/0010672 | A1* | 1/2002 | Waelbroeck | G06Q 30/08 705/37 |
| 2002/0046125 | A1* | 4/2002 | Speicher | G06Q 10/087 705/22 |
| 2002/0099641 | A1* | 7/2002 | Mills | G06Q 40/04 705/37 |
| 2007/0043648 | A1* | 2/2007 | Chait | G06Q 40/00 705/37 |
| 2008/0109288 | A1* | 5/2008 | Borkovec | G06Q 40/06 705/36 R |
| 2008/0249959 | A1* | 10/2008 | Mittal | G06Q 40/06 705/37 |

OTHER PUBLICATIONS

O'Brien, Justin: Culture Wars: Rate Manipulation, Institutitional Corruption, and the Lost Normative Foundations of Market Conduct Regulation, Jun. 12, 2013, pp. 1-48. (Year: 2013).*

Foreign Exchange Committee: Tools for Mitigating Credit Risk in Foreign Exchange Transactions, Nov. 2010, pp. 1-6 (Year: 2010).*

Anand et al.: Should Exchanges Impose Market Maker Obligations, Mar. 2013, pp. 1-44 (Year: 2013).*

* cited by examiner

TECHNIQUES FOR AUTOMATED CALL CROSS TRADE IMBALANCE EXECUTION

RELATED APPLICATIONS

This application is a continuation of, claims the benefit of and priority to previously filed U.S. patent application Ser. No. 16/131,082, titled "TECHNIQUES FOR AUTOMATED CALL CROSS TRADE IMBALANCE EXECUTION," filed Sep. 14, 2018 (now U.S. Pat. No. 11,023,970), which is a continuation of U.S. patent application Ser. No. 14/664,732, entitled "TECHNIQUES FOR AUTOMATED CALL CROSS TRADE IMBALANCE EXECUTION", filed Mar. 20, 2015 (now U.S. Pat. No. 10,102,578), which claims the benefit of priority under 35 U.S.C. § 119(e) to U.S. Provisional Application No. 61/969,791, entitled "Techniques for Automated Call Cross Trade Imbalance Execution," filed Mar. 24, 2014, and U.S. Provisional Application No. 61/994,711, entitled "Techniques for Automated Call Cross Trade Imbalance Execution," filed May 16, 2014, which are hereby incorporated by reference in their entireties.

BACKGROUND

The foreign exchange market is largely unregulated and, recently, evidence of collusion among banks handling foreign exchange trading has emerged. Collusion among banks, or individuals, may lead to the fixing and manipulation of foreign exchange benchmark rates in a manner that takes advantage of clients participating in the foreign exchange market. In a typical foreign exchange scenario, a client may submit an order to be placed using benchmark rates (e.g., the WM/Reuters® rate), which may be set multiple times daily. However, the benchmark rate is not yet set when orders are placed. Since banks, or individuals, may know of positions prior to the benchmark rate being fixed, they have the opportunity to collude on the orders in a direction that is advantageous to the bank.

To avoid such collusion and rate manipulation, it may be advantageous to use a foreign exchange trading system that limits the knowledge of positions prior to a daily benchmark rate being set. By limiting the knowledge of positions to banks and individuals, the opportunity to collude when setting a benchmark rate may be diminished.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for automated call cross trade imbalance execution. Techniques described herein may provide an automated crossing solution for buy-side clients that limits position information to banks and individuals prior to setting a benchmark rate for foreign exchange. In some embodiments, clients may roll forward spot trades with a chosen counterparty bank, which is then sent to an automated bank platform. Techniques described herein may offer a multi-bank platform solution that accepts trades, validates trades, performs credit checks, and executes trades in a manner that limits knowledge of position information prior to setting a benchmark rate.

Further, proposed techniques include determining a trade imbalance and automatically executing the determined trade imbalance in a manner such that market impact is minimalized. In some embodiments, trade imbalances may be calculated on a bank-by-bank basis and forwarded to each bank, thus allowing each bank to execute its own trade imbalance. Further, particular embodiments may include shared risk participation in which clients may benefit from and share in the risk or reward associated with a market execution in return for a mid-point rate service in normal market conditions on an equitable basis. Other embodiments are described.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
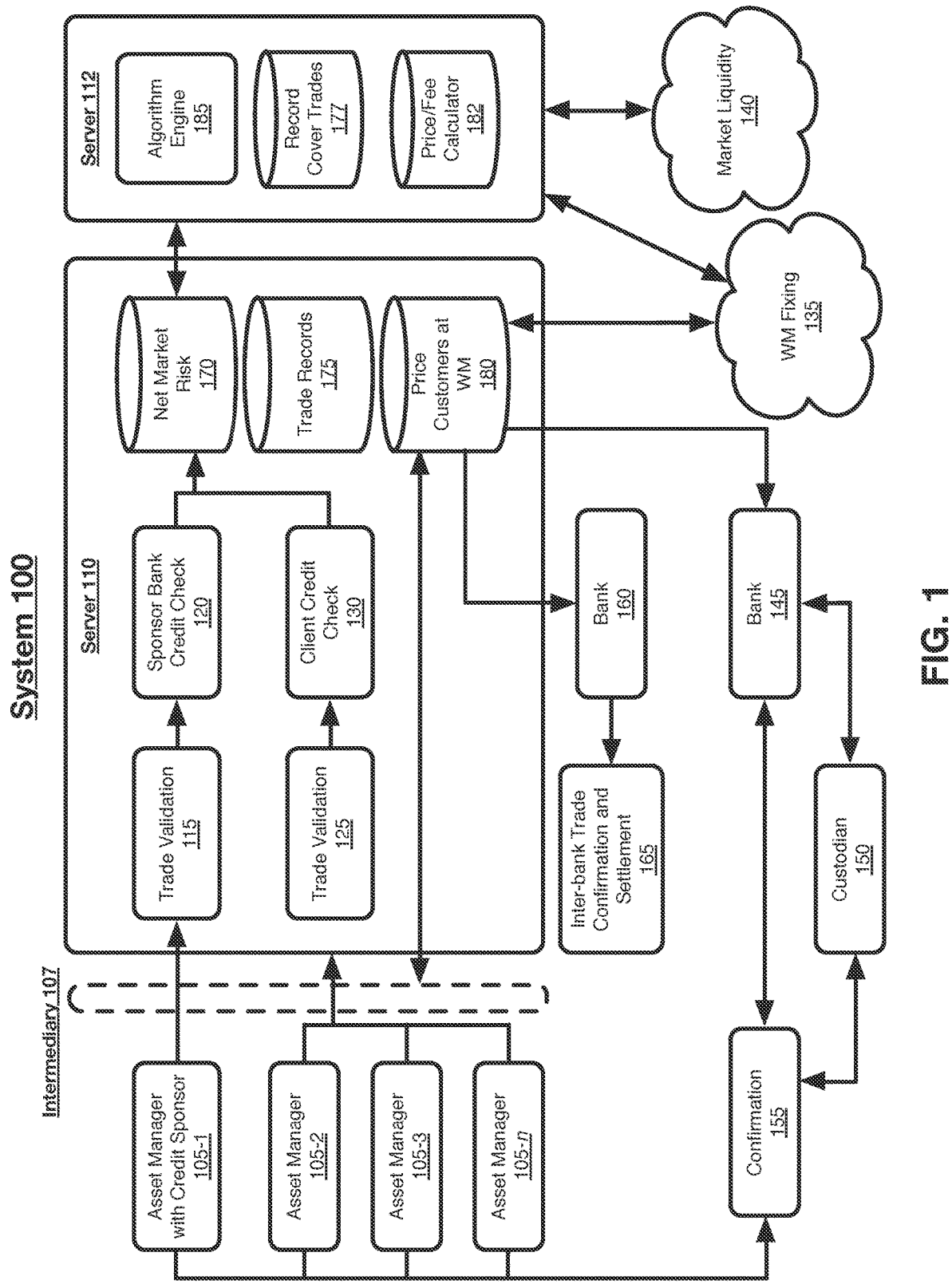
FIG. 1 illustrates an embodiment of a system.

Various embodiments are generally directed to techniques for automatically executing a trade imbalance in a foreign exchange call cross system. Various embodiments are generally directed to techniques for automated call cross trade imbalance execution. Techniques described herein may provide an automated crossing solution for buy-side clients that limits position information to banks and individuals prior to setting a benchmark rate for foreign exchange. In some embodiments, clients may roll forward spot trades with a chosen counterparty bank, which is then sent to an automated bank platform. Techniques described herein may offer a multi-bank platform solution that accepts trades, validates trades, performs credit checks, and executes trades in a manner that limits knowledge of position information prior to setting a benchmark rate.

Further, proposed techniques include determining a trade imbalance and automatically executing the determined trade imbalance in a manner such that market impact is minimized. In some embodiments, trade imbalances may be calculated on a bank-by-bank basis, thus allowing each bank to execute its own clients' trade imbalance. Still further, particular embodiments may include shared risk participation in which clients may benefit from and share in the risk or reward associated with a market execution in return for a mid-point rate service in normal market conditions on an equitable basis. Other embodiments are described.

Limiting knowledge of position information to one or more specifically programmed components or modules provides the important function of minimizing, or completely diminishing, collusion when setting a benchmark rate. Techniques described herein may be performed by one or more specifically programmed components or modules in an isolated and automated manner, rather than by individuals, for the purpose of preventing collusion, and thus, ensuring the integrity of the benchmark rate setting process.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise one or more components. Although the system 100 shown in FIG. 1 has a limited number of elements in a certain topology, it may be appreciated that the system 100 may include more or less elements in alternate topologies as desired for a given implementation. The system 100 may include a server 110, which may be generally operative to interact with one or more components or modules within system 100. Server 110 may include one or more processing units, storage units, network interfaces, or other hardware and software elements, described in more detail below.

In an embodiment, each component may comprise a device, such as a server, comprising a network-connected storage device or multiple storage devices, such as one of the storage devices described in more detail herein. In an example, asset manager components 105 may include one or more devices used to access software or web services provided by server 110. For example, asset manager components 105 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a wearable computing device such as a smart watch, a server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, server 110 and the other components of system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the components and modules of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In an embodiment, asset manager components 105-1-$n$ may include one or more computing modules associated with banks, customers, or other entities that may participate in trading positions in a market, such as the foreign exchange market. It is worthy to note that "n" and "m" and similar designators as used herein are intended to be variables representing any positive integer. Thus, for example, if an implementation sets a value for n=10, then a complete set of asset manager components 105-$n$ may include components 105-1, 105-2, 105-3, 105-4, 105-5, 105-6, 105-7, 105-8, 105-9, and 105-10. The embodiments are not limited in this context and it will be appreciated that in various embodiments different values of n and other designators may be used. Each asset manager component may be configured to receive one or more orders for a trade of an asset, such as currency, from clients or customers. Orders may be placed in a variety of ways, including through automated phone systems, websites, smartphone applications, and the like.

Each asset manager component 105 may be responsible for one or more trades sent to server 110. Trades may be one or more data messages sent via an intermediary system, such as intermediary 107. Intermediary 107 may include a trading platform operated by a third-party, or a trading platform associated with server 110, which may provide secure access to server 110. In one example, intermediary 107 may include the FX Connect® platform, however, it can be appreciated that other platforms may be used. In other embodiments, an intermediary platform may not be used. Each trade may include information indicating whether the trade is a buy or a sell, the specific currency being bought or sold, the specific amount of currency to be bought or sold, the other currency desired, the date of trade settlement, the specific benchmark rate fixing desired, and associated bank. In an exemplary embodiment, a plurality of trades may be sent from a plurality of asset manager components 105 to server 110, via intermediary 107. A first asset manager component 105-1 may use a credit sponsor for a particular trade, while other asset manager components may submit trades to server 110 without a credit sponsor. In one example, asset manager component 105-1 may place an order to buy €20 M at the WM/Reuters® mid-point benchmark rate. Asset manager component 105-2 may place an order to buy €50 M at the WM/Reuters® mid-point benchmark rate. Asset manager component 105-3 may place an order to buy €20 M at the WM/Reuters® mid-point benchmark rate. Asset component 105-n may place an order to sell €50 M at the WM/Reuters® mid-point benchmarks rate. While specific currencies, amounts, and rates may be used for purposes of illustration, it can be appreciated that other amounts, currencies, and rates may be used in various implementations.

In some embodiments, trade validation modules 115 and 125 may be configured to receive orders from asset manager components 105 at server 110, which may be sent via an intermediary 107, as discussed above. Trade validation modules 115 and 125 may be configured to confirm one or more validation criteria for each order. In one example, trade validation modules 115 and 125 may be configured to determine whether one or more orders have been received within designated timeframe, for example, a defined period of time prior to a benchmark rate being set. Further, trade validation modules 115 and 125 may be configured to determine whether each received order includes an eligible currency pair or an eligible counterparty, for example. Once validated, each order may be forwarded to credit check modules 120 or 130.

Sponsor bank credit check module 120 and client credit check module 130 may be configured to perform credit checks for parties associated with orders received at server 110. Each credit check module may be configured to extract credit information, such as name and tax identification number, from an order and perform a credit check using such information. Credit check modules 120 and 130 may utilize an internal credit database (not shown), or may communicate with an outside credit database or service using one or more of the communication techniques described herein. In some embodiments, credit check modules 120 and 130 may provide an acknowledgement of creditworthiness after a credit check is verified, or may deny an order if a credit check fails. In either case, a response from credit check modules 120 or 130 may be sent using one or more communication techniques described herein from server 110 to one or more asset managers 105, and in some embodiments, via intermediary 107.

An embodiment may include a net market risk module 170. Net market risk module 170 may be configured to accept one or more orders and determine a net of positions. Such a determination may include a netting of trades received from asset manager components 105. For example, using the example set forth above, four orders (Buy €20 M, Buy €50 M, Buy €20 M, and Sell €50 M) may be netted into an imbalance of Buy €40 M by net market risk module 170. Once a net imbalance has been determined, the net imbalance amount may be communicated to algorithm engine component 185 of server 112, where it may be stored in one or more non-transitory computer-readable storage mediums. In an embodiment, order information and/or the net imbalance may be stored in a secure or isolated manner such that they are unavailable to outside observers. In some embodiments, net market risk module 170 may be configured to automatically determine a net imbalance and communicate the determined net imbalance to algorithm engine component for storage on a non-transitory computer-readable storage medium without disclosing such information to outside observers. In this manner, individuals or institutions may be unaware of a total position amount, or an amount of a trade imbalance, which may minimize the opportunity for collusion or manipulation of market rates.

In an embodiment, server 112 may be communicatively connected to server 110 and may include algorithm engine component 185, record cover trades module 117, and price/fee calculator 182. While server 110 and server 112 are illustrated separately, it can be appreciated that they may be combined into a single server in some embodiments. Algorithm engine component may be executed within server 112 and may communicate with server 110, such as in a distributed system, as described further herein. In any case, algorithm engine component 185 may be configured to automatically execute a net imbalance received from net market risk module 170. Record cover trades module 177 may be configured to store information related to one or more executed trades, such as in a database.

In an example, the net order imbalance, sometimes referred to as the tail, may be executed over a defined time period. A defined time period may be substantially the same, or the same, time period used to match the published methodology of a recognized benchmark, such as that of the WM Company®, using market liquidity component 140, which may comprise one or more computing devices configured for electronic trading of assets. As each order is executed, order information may be sent to a book and trade records module 175, which may include one or more storage modules and/or databases for recording executed orders. Algorithm engine component 185 may be configured to place electronic orders to aggresse the market to execute a particular amount in defined time intervals throughout the defined time period for orders. Simultaneously, algorithm engine component 185 may be configured to place resting orders such that risk is passively executed on the other side of the market spread. In some embodiments, the operations of algorithm engine component 185 may be repeated substantially in parallel across multiple market venues, in order to seek best price availability. Dependent upon the fill rates on both the passive and aggressive orders returned from the various execution venues, algorithm engine component 185 may be configured to dynamically manage a ratio of passive hedging throughout an order lifecycle.

In an example, WM fixing component 135 may determine a daily benchmark rate, such as the WM/Reuters® rate, based upon market activity over a defined time period. WM fixing component 135 may be operated by an entity associated with server 110, or may be operated by a third-party in some embodiments. The defined time period for execution of a trade imbalance may be during the defined time period for WM fixing component 135 to fix the WM/Reuters® rate. As described herein, algorithm engine component 185 may be configured to automatically execute a trade imbalance during substantially the same time period that WM fixing component 135 determines a benchmark rate. Algorithm engine component 185 may be configured to automatically execute a trade imbalance such that the determination of a benchmark rate by WM fixing component is not materially altered. While a WM benchmark rate may be referred to herein for purposes of illustration, it can be appreciated that embodiments may be directed to the determination of other market rates.

In some embodiments, algorithm engine component 185 may be configured to automatically reduce the potential for directional information working against the economics of the underlying order. For example, the algorithm engine component 185 may be configured to place passive orders in the opposite direction to an underlying order and aggregate fills on these orders to gauge overall market sentiment. If these orders are consistently being filled, algorithm engine component 185 may determine that there are others in the market executing orders in the same direction (or following the order). This information may be used by algorithm engine component 185 to manage the aggressiveness of automatic execution of the net imbalance. During execution of a net imbalance, algorithm engine component may be configured to constrain the amounts being ordered, both passively and aggressively, to ensure an average execution rate does not drift from a time-weighted average price (TWAP) reference price being measured from market data over the defined order time period. During execution, algorithm engine component 185 may not disclose information regarding the amount of a net imbalance to outside observers. For example, information regarding the amount of a net imbalance may be stored in a non-transitory computer-readable storage medium that is secure from individuals or institutions. In this manner, individuals or institutions may be unaware of a total position amount, or an amount of a trade imbalance, which may minimize the opportunity for collusion or manipulation of market rates. In some embodiments, a percentage remaining may be disclosed by algorithm engine component 185 and subsequently displayed. For example, algorithm engine component 185 may provide a "50%" reading to a display device (not shown) to indicate that execution of a trade imbalance is half way complete.

In some embodiments, price/fee calculator module 182 of server 112 may be used to determine proper fees using pricing calculations during the execution of trading imbalances by algorithm engine 185. Price/fee calculator module 182 may utilize market condition variable elements to execute a methodology using fixed and variable components for a charging structure, as described below. In an example, fees may be collected by way of adjustment to the executed trade rate. Price/fee calculator module 182 may be configured to apply fixed fees to the gross amount of orders from all participant clients submitting orders to server 110. Fee rates may be the same for all participants. In addition, price/fee calculator 182 may be configured to add fees from third-party banks, which may be defined and stored in a non-transitory computer-readable storage medium. In the case of "block" order submissions, the fee may be based on the net of the block. A reference point (by currency pair) for all charging may be the mid-point of the published WM/Reuters® bid/ask spread for the relevant benchmark session to which the order is submitted.

In an embodiment, a fixed fee may defined in basis points (bps) and may vary by currency pair. These fees may be amended with due notice from time to time. The fee may be collected by adjusting the WM/Reuters® mid-point to reflect the basis point value of the charge. The fee will therefore show as a traded profit in the books of an agent, such as the TruCross/FX® ATS Agent in one example. Fixed fees may always be applied.

In some embodiments, under certain circumstances described below, there may be a variable fee applied to a transaction in addition to the fixed fee. A positive variable fee (i.e. cost reduction to the client) may occur when the market risk tail order execution rate beats the WM/Reuters® mid-point in the direction of the order, e.g., a buy order completed below the mid-point. A negative fee (i.e. cost increase to the client) may occur when the tail execution rate falls outside the WM/Reuters® bid/ask published rate. Variable fees may only be applied to those clients whose orders are in the same direction as the tail execution.

The price/fee calculator module 182 may be configured to handle multiple pricing scenarios, such as risk sharing. For example, when the mid-rate is matched, all clients may receive the mid-rate less fees. Revenue, in this scenario, may be the gross order amount multiplied by the relevant basis point charge. When the mid-rate is beaten, 100% of the traded gain may be distributed to the gross buyers or sellers who are in the same direction as the tail (if a buy tail order, the buyers get the improvement, sellers get mid, all less fees). Revenue in this scenario may be 100% of the fixed fee, calculated as the gross amount of the order multiplied by the relevant basis point fee. When the mid-rate is missed but the executed price is inside the published WM/Reuters® bid/mid or ask/mid, depending on order direction, then clients may get mid-rate less fees. The system 100 may absorb any downside economic impact (100% fees less cost of tail execution) in this scenario. When the mid-rate is missed and outside the WM/Reuters® bid or ask rates, the clients in the same direction as the tail may collectively absorb, pro rata, the economic cost of the tail execution, calculated as the tail size multiplied by the gap between actual execution rate and published bid or ask rate as appropriate. Revenue in this scenario may be the standard fees of the gross order less the cost of half the bid/ask spread multiplied by the tail amount. Some examples of risk sharing are further described below with respect to FIGS. 2A-C.

In some embodiments, in the event of extreme market stress where a particular currency market is not operating efficiently (e.g. times of geopolitical tension) the system 100 may reserve the right to cancel a cross session in the affected currency pair and offer the service in that currency pair on a best endeavours basis where the execution will be "at market" even though the rate achieved falls within the published bid/ask WM/Reuters® spread for that session.

Once any trade imbalances have been executed and a benchmark market rate has been set, a WM pricing module 180 may be configured to use a determined benchmark rate, such as the WM/Reuters® rate, for each order executed during a defined time period. For example, all orders placed on or before a particular time before a benchmark rate has been set may be eligible to use the benchmark rate. Executed orders may be stored in a non-transitory computer-readable storage medium and transmitted, possibly with some fees taken, as described above with respect to price/fee calculator module 182, and confirmed to banks, such as bank components 145 and 160. Bank components 145 and 160 may include one or more computing devices associated with banks representing clients. Executed order information may also be sent along to a custodian component 150 and a confirmation component 155, which may include a real-time, multi-counterparty foreign exchange trade matching and confirmation system.

One example of a confirmation system is the Global Trading Support Services (GTSS) system, however, other confirmation systems may be used. Confirmation component 155 may act as an account and contract database, storing and transmitting automatic notification of account changes between trading partners. Confirmation component 155 may be configured to allow users to directly access the records of their counterparties, enabling the system to match transactions regardless of whether the trade was executed electronically. Confirmation component 155 may also act as a messaging platform to both custodians and counterparties, communicating trade details and settlement instructions via real-time messaging. In some embodiments, executed order information may be sent to inter-bank trade confirmation and settlement component 165. One example of an inter-bank trade confirmation and settlement component is CLS.

Figure 2A:
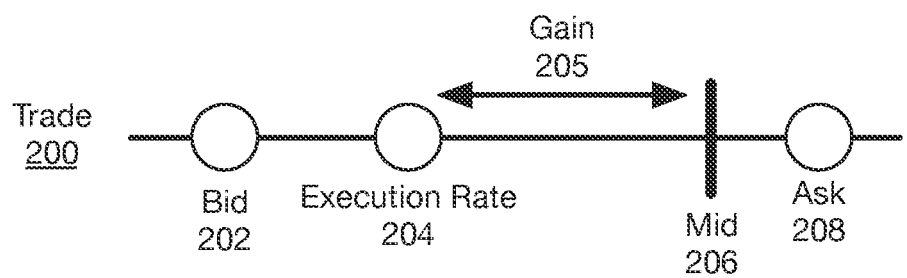
FIG. 2A illustrates an exemplary trade according to an embodiment.

FIG. 2A illustrates an exemplary trade 200 according to an embodiment. As discussed above, a variable fee may be used to implement a risk-sharing scheme. In such a risk-sharing scheme, clients may realize some or all gains, an operating service may absorb slippage within a bid/ask range, and losses outside a bid/ask range may be calculated and split among all clients on a pro rata basis. A price/fee calculator module, such as price/fee calculator module 182 of server 112, may be used to determine variable fees using pricing calculations during the execution of trading imbalances by an algorithm engine, such as algorithm engine 185. As illustrated within FIG. 2A, trade 200 may include a bid 202 and ask 208, with values in between (and including) the bid 202 and ask 208 being the bid/ask range. A mid-rate 206 may be a benchmark rate, such as the WM/Reuters® mid-point rate, for example. An execution rate 204 may be an average execution rate achieved by an algorithm engine during execution of a net imbalance, as described above with respect to FIG. 1. As shown, trade 200 illustrates an execution rate 204 that has fallen below the mid-rate 206, resulting in a gain 205. In an embodiment, and as described in detail below, some or all of the gain 205 may be allocated to one or more clients.

When a gain relative to the mid-rate has been realized, some or all of the traded gain may be distributed to the gross buyers or sellers who are in the same direction as the tail. In one example, if a buy tail order is executed, the buyers may receive the improvement and sellers may receive the mid-rate, both net of fixed fee rate adjustments. The following example uses specific values, however, it can be appreciated that the specific values described herein are used for illustrative purposes only and should not be limiting in any way. In the example, assume the bid 202 is 1.3500 and the ask 208 is 1.3504 with an execution rate 204 of 1.3501 on a net buy of €100,000,000. In this case, an algorithm engine was able to beat the mid-rate 206 by 0.0001=1.3502−1.3501. The economic impact of 0.0001 on €100,000,000 is $10,000. Further, assume a fee of 0.5 bps. The gross EUR buy amount in the example is €600 M. To buy €600 M under the assumed fee schedule would have cost: €600,000,000×1.3502×(1+0.00005)=$810,160,506. However, there is a variable adjustment rebate of $10,000 due to the gain. Thus, the final cost to clients will be $810,160,506−$10,000=$810,150,506. From this number an effective rate can be determined: 810,150,506/600,000,000=1.35025. Sellers of EUR do not share in this gain will receive the standard rate of 1.3502×(1−0.00005)=1.35013.

Figure 2B:
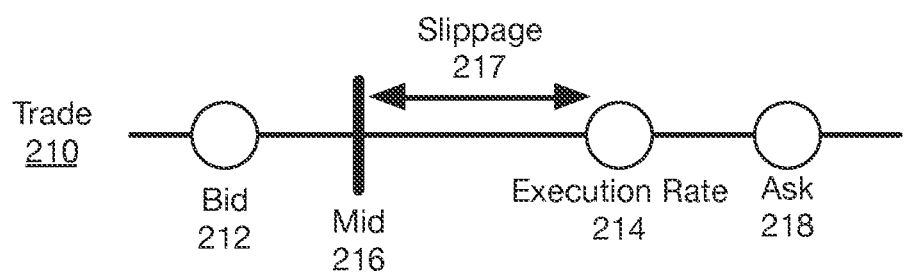
FIG. 2B illustrates an exemplary trade according to an embodiment.

FIG. 2B illustrates an exemplary trade 210 according to an embodiment. As discussed above, a variable fee may be used to implement a risk-sharing scheme. In such a risk-sharing scheme, clients may realize some or all gains, an operating service may absorb slippage within a bid/ask range, and losses outside a bid/ask range may be calculated and split among all clients on a pro rata basis. A price/fee calculator module, such as price/fee calculator module 182 of server 112, may be used to determine variable fees using pricing calculations during the execution of trading imbalances by an algorithm engine, such as algorithm engine 185. As illustrated within FIG. 2B, trade 210 may include a bid 212 and ask 218, with values in between (and including) the bid 212 and ask 218 being the bid/ask range. A mid-rate 216 may be a benchmark rate, such as the WM/Reuters® mid-point rate, for example. An execution rate 214 may be an average execution rate achieved by an algorithm engine during execution of a net imbalance, as described above with respect to FIG. 1. As shown, trade 210 illustrates an execution rate 214 that has fallen above the mid-rate 216 but within the bid/ask range, resulting in slippage 217. In an embodiment, and as described in detail below, some or all of slippage 217 may be allocated to the operating service.

The following example uses specific values, however, it can be appreciated that the specific values described herein are used for illustrative purposes only and should not be limiting in any way. If an algorithm engine achieves an execution on the tail amount less than the mid-rate but within the bid/ask spread, clients may receive the standard mid-rate, net of fixed fee rate adjustments and an operating service may absorb any slippage costs. In an example, an executed tail may be from the purchase of GBP. The bid 212 may be 1.6400 and the ask 218 may be 1.6404 with a mid-rate 216 of 1.6402. An algorithm engine may achieve a tail execution rate of 1.6403, resulting in a loss within the bid/ask range, referred to as slippage 217. Since the execution rate 214 was within the bid/ask spread, an operating service may absorb this slippage cost and clients may receive the mid-rate 216. For example, buyers of GBP will pay 1.6402×(1+0.00005)=1.64028 and sellers of GBP will receive 1.6402×(1−0.00005)=1.64011.

Figure 2C:
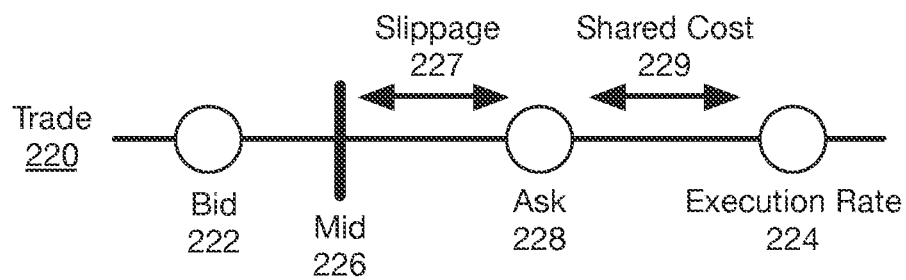
FIG. 2C illustrates an exemplary trade according to an embodiment.

FIG. 2C illustrates an exemplary trade 220 according to an embodiment. As discussed above, a variable fee may be used to implement a risk-sharing scheme. In such a risk-sharing scheme, clients may realize some or all gains, a service may absorb slippage within a bid/ask range, and losses outside a bid/ask range may be calculated and split among all clients on a pro rata basis. A price/fee calculator module, such as price/fee calculator module 182 of server 112, may be used to determine variable fees using pricing calculations during the execution of trading imbalances by an algorithm engine, such as algorithm engine 185. As illustrated within FIG. 2C, trade 220 may include a bid 222 and ask 228, with values in between (and including) the bid 222 and ask 228 being the bid/ask range. A mid-rate 226 may be a benchmark rate, such as the WM/Reuters® mid-point rate, for example. An execution rate 224 may be an average execution rate achieved by an algorithm engine during execution of a net imbalance, as described above with respect to FIG. 1. As shown, trade 220 illustrates an execution rate 224 that has fallen above the mid-rate 216 and outside the bid/ask range, resulting in slippage 227 (loss within the bid/ask range) and shared cost 229 (loss outside the bid/ask range). In an embodiment, and as described in detail below, some or all of slippage 217 may be allocated to the operating service and some or all of shared cost 229 may be allocated to one or more clients. In an embodiment, shared cost 229 may be capped at a defined maximum amount.

The following example uses specific values, however, it can be appreciated that the specific values described herein are used for illustrative purposes only and should not be limiting in any way. If due to illiquid market conditions or other market dislocations, an execution rate achieved by an algorithm engine is outside the published bid/ask spread, the economic cost of the outside portion may be shared among clients in the same direction as the tail. For example, assume the AUD published bid 222 is 0.9100 and the ask 228 is 0.9104 with an execution rate 224 of 0.9105 on an executed tail of a buy of A$250 M. In this case, the execution rate 224 was outside the bid/spread by 0.9105−0.9104=0.0001. The economic impact of 0.0001 on A$250 M is $25,000 (USD). Further, assume a fee of 0.5 bps. The gross buy amount in the example is A$300 M. To buy A$300 M under the assumed fee would cost A$300,000,000×0.9102×(1+0.00005)=$273,073,653. However, there is an additional cost of $25,000 that may be shared among all buyers. Thus, the final cost to buyers will be $273,073,653+$25,000=$273,098,653. From this number we back into the effective rate of 273,098,653/300,000,000=0.91033. Sellers of AUD may not be impacted and may receive the standard rate of 0.9102×(1−0.00005)=0.91015. It can be appreciated that shared costs may be split among clients on a pro rata basis, or evenly, based upon business and design considerations. In addition, shared costs, such as shared cost 229, may be capped at a defined amount.

Figure 3:
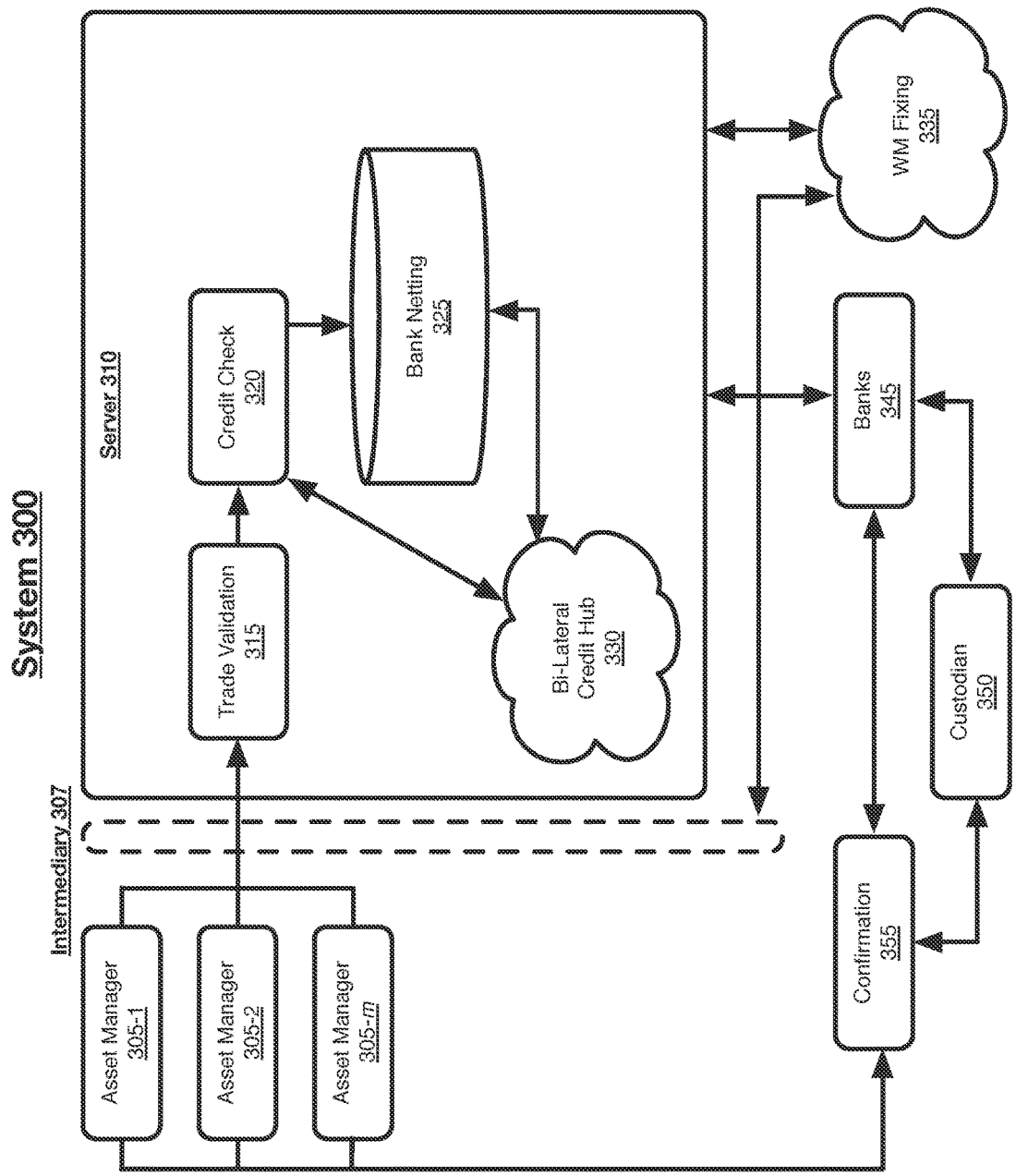
FIG. 3 illustrates an embodiment of a system.

FIG. 3 illustrates a block diagram for a system 300. In one embodiment, the system 300 may comprise one or more components. Although the system 300 shown in FIG. 3 has a limited number of elements in a certain topology, it may be appreciated that the system 300 may include more or less elements in alternate topologies as desired for a given implementation. The system 300 may include a server 310, which may be generally operative to interact with a plurality of components and modules of system 300.

Like system 100, system 300 may be configured to accept a plurality of orders, such as foreign exchange orders. However, unlike system 100, system 300 may be configured to determine a trade imbalance on a bank-by-bank basis. In this manner, rather than automatically settling a trade imbalance, trade imbalances associated with each of a plurality of banks may be transmitted to each respective bank. In this manner, banks may individually handle any trade imbalances attributed to the bank. In addition, unlike system 100, system 300 may provide two levels of netting for a WM/Reuters® benchmark flow. The additional netting may eliminate a portion of the volume being executed in the WM/Reuters® benchmark window, reducing the impact to a determined WM/Reuters® rate.

In an embodiment, asset manager components 305-1-$m$ may include one or more computing modules associated with banks, customers, or other entities that may participate in trading positions in a market, such as the foreign exchange market. Each asset manager component may be configured to receive one or more orders for a trade of an asset, such as currency, from clients or customers. Orders may be placed in a variety of ways, including through automated phone systems, websites, smartphone applications, and the like.

Each asset manager component 305 may be responsible for one or more trades sent to server 310. Trades may be sent via an intermediary system, such as intermediary 307. Intermediary 307 may include a trading platform operated by a third-party, or a trading platform associated with server 310, which may provide secure access to server 310. In one example, intermediary 307 may include the FX Connect® platform, however, it can be appreciated that other platforms may be used. In other embodiments, an intermediary platform may not be used. Each trade may include information regarding a currency amount, benchmark rate, and associated bank. In an exemplary embodiment, a plurality of trades may be sent from a plurality of asset manager components 305 to server 310. Trades may be associated with one or more banks, however, each identified bank may be unaware that they have been associated with a particular order. In this manner, collusion or manipulation of market rates based upon known positions may be reduced.

In some embodiments, trade validation module 315 may be configured to receive orders from asset manager components 305 at server 310. Trade validation module 315 may be configured to confirm one or more validation criteria for each order. In one example, trade validation module 315 may be configured to determine whether one or more orders have been received within designated timeframe, for example, a defined period of time prior to a benchmark rate being set. Further, trade validation module 315 may be configured to determine whether each received order includes an eligible currency pair or an eligible counterparty, for example. Once validated, each order may be time-stamped and forwarded to credit check module 320.

Credit check module 320 may be configured to perform credit checks for parties associated with orders received at server 310. Credit check module 320 may be configured to extract credit information, such as name and tax identification number, from an order and perform a credit check using such information. Credit check module 320 may utilize an internal credit database (not shown), or may communicate with an outside credit database or service using one or more of the communication techniques described herein. In some embodiments, credit check module 320 may provide an acknowledgement of creditworthiness after a credit check is verified, or may deny an order if a credit check fails. In either case, a response from credit check module 320 may be sent using one or more communication techniques described herein from server 310 to one or more asset managers 305.

In some embodiments, a first netting phase may be performed by bank netting module 325. In a first netting phase, orders may be netted in a manner as discussed above with respect to FIG. 1. Bank netting module 325 may perform netting in a bank-specific manner, matching buys and sells by currency pair for a particular bank only. Netting by bank netting module 325 may be performed during a defined time period prior to a WM/Reuters® rate setting window, which may be defined such that time is available prior to WM/Reuters® rate setting to perform an additional netting phase. Bank netting component may send a calculated trade imbalance to a second phase of netting at bi-lateral credit hub module 330.

Bi-lateral credit hub module 330 may be configured to perform a second phase of netting in conjunction with bank netting module 325. Bi-lateral credit-hub module 330 may be multi-bank, where multiple banks may cross positions at the WM/Reuters® mid-point rate with each other. Unlike the first netting phase, discussed above, bi-lateral credit hub 330 may generate actual trades that may need to be settled. Each order's time stamp may determine its position in a matching queue. At a defined time period before the WM/Reuters® rate window, bi-lateral credit hub 330 may be configured to automatically net down positions. In an embodiment, the system may generate actual bi-lateral trades, but those trades may not be executed using a market liquidity component at that time. The actual trades may be those bi-lateral trades between banks, which may net off available positions. Trades may be marked at the WM/Reuters® mid-point rate, however, this rate may not be known until after WM/Reuters® publishes the rate. Thus, the system may be aware that there are bi-lateral trades which will net off some inter-bank risk, but may not price or release those trades until after fix rate publication.

The actual crossing mechanics may be driven by the timestamp on each order and the established credit lines between each participating bank. In one example, matching may be automatically performed on a first-in-first-matched basis by currency pair. If, however, a particular bank does not have credit lines to execute an otherwise matching order, it may be skipped. To minimize the skipping of banks due to credit, and increase the level of netting, bi-lateral credit hub module 330 may be configured to utilize an enhanced version of bi-lateral credit functionality. The enhanced bi-lateral credit hub functionality may allow bi-lateral credit hub 330 to automatically perform several trades to accomplish a match. For example, Bank A may not have credit with Bank C but Bank B may have credit with both Bank A and Bank C. In this case, Bank A may trade with Bank B, and Bank B can trade with Bank C, accomplishing the same netting as when Bank A and Bank C have sufficient credit to trade directly. Bi-lateral credit hub 330 may be configured to automatically determine the available of such trading situations, and may automatically perform such a series of trades to increase the level of available netting.

In an example, WM fixing component 335 may determine a daily benchmark rate, such as the WM/Reuters® rate, based upon market activity over a defined time period. While a WM/Reuters® benchmark rate may be referred to for purposes of illustration, it can be appreciated that embodiments may be directed to the determination of other market rates. During the second netting phase, bi-lateral credit hub may apply the WM/Reuters® rates from WM fixing module 335 to original orders. Server 310 may be configured to bank/client fee structures and add bid/offer spreads to the mid-point rates, if desired. In an embodiment, server 310 may send the orders to the manual pricing desks of each bank 345 to execute the forward component of the trades.

Once both netting phases have been completed, there may be orders remaining that are unmatched, either due to the lack of volume in the opposite direction or lack of credit. Each bank may maintain ownership of their specific orders that were unmatched. Bank netting component 325 may provide all the matched and unmatched information back to the banks in time for them to manage their own tail risks at the WM/Reuters® rate fix. System 300 may be configured such that this is the first time that banks 345 become aware of the orders received from asset manager components 305. In this manner, collusion and manipulation of a benchmark rate may be reduced.

Executed order information may be sent along from banks 345 to a custodian component 350 and a confirmation component 355, which may include a real-time, multi-counterparty, foreign exchange trade matching and confirmation system. Confirmation component 355 may act as an account and contract database, transmitting automatic notification of account changes between trading partners. Confirmation component 355 may be configured to allow users to directly access the records of their counterparties, enabling the system to match transactions regardless of whether the trade was executed electronically. Confirmation component 355 may also act as a messaging platform to both custodians and counterparties, communicating trade details and settlement instructions via real-time messaging.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 4:
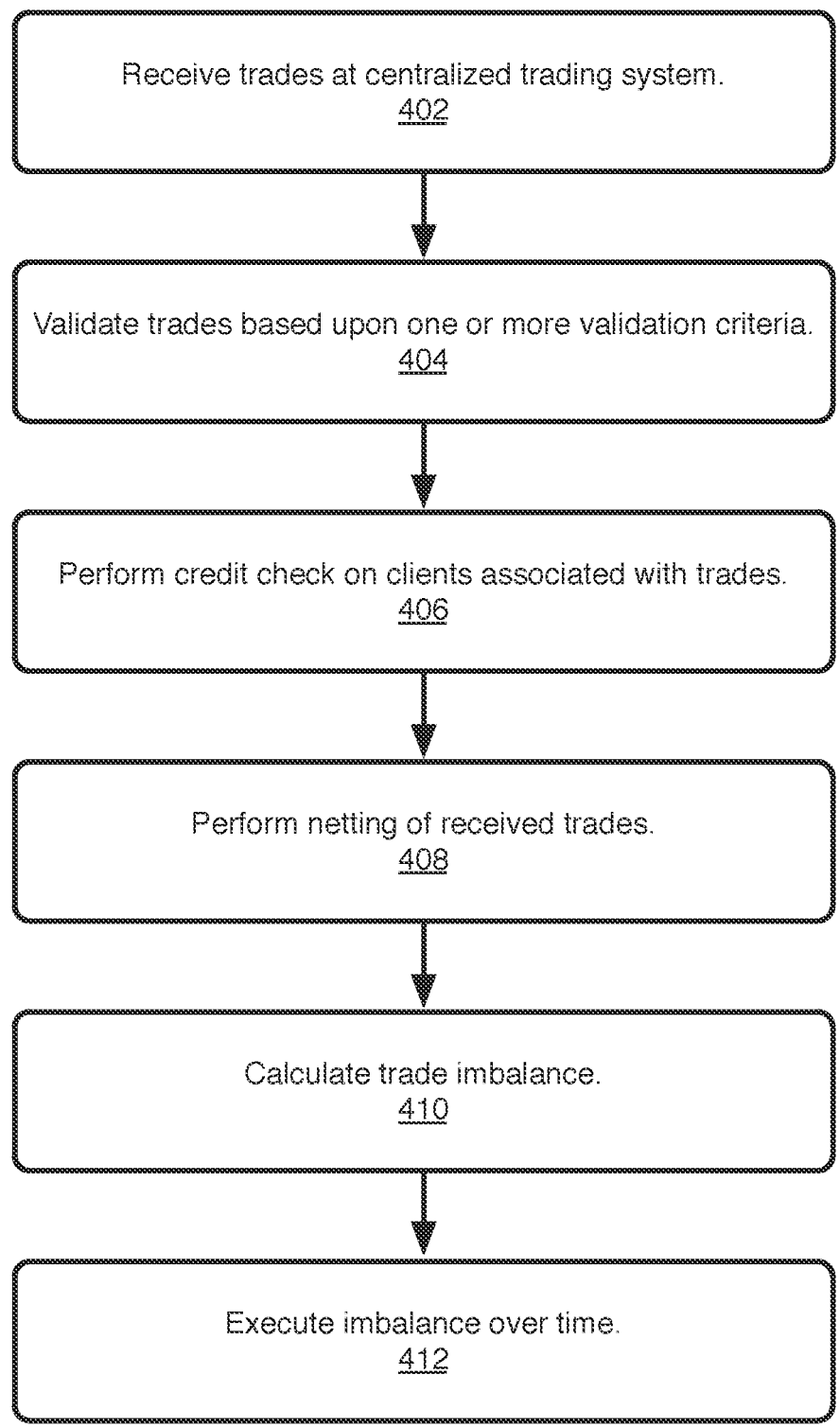
FIG. 4 illustrates a logic flow according to an embodiment.

FIG. 4 illustrates one embodiment of a logic flow 400. The logic flow 400 may be representative of some or all of the operations executed by one or more embodiments described herein. For instance, the logic flow 400 may be representative of some or all of the operations executed by system 100, and the components and modules included therein, for example.

At 402, one or more electronic trades may be received and stored at a centralized trading system. In an embodiment, an asset manager component may be responsible for one or more trades sent to a centralized server, which may be sent via an intermediary component. Each trade may include information regarding a currency amount, benchmark rate, and associated bank, among other information discussed herein.

At 404, the one or more trades may be validated based upon one or more validation criteria. One or more trade validation modules may be configured to receive orders from asset manager components via an intermediary component, for example. Trade validation modules may be configured to confirm one or more validation criteria for each order. In one example, trade validation modules may be configured to determine whether one or more orders have been received within designated timeframe, for example, a defined period of time prior to a benchmark rate being set. Further, trade validation modules may be configured to determine whether each received order includes an eligible currency pair or an eligible counterparty, for example.

At 406, a credit check may be performed on clients associated with the one or more trades. A credit check module may be configured to perform credit checks for parties associated with orders received at a centralized server. The credit check module may be configured to extract credit information, such as name and tax identification number, from an order and perform a credit check using such information. Credit check modules may utilize an internal credit database, or may communicate with an outside credit database or service using one or more of the communication techniques described herein. In some embodiments, credit check modules may provide an acknowledgement of creditworthiness after a credit check is verified, or may deny an order if a credit check fails. In either case, a response from credit check modules may be sent using one or more communication techniques described herein from the centralized server to one or more asset managers.

At 408, a netting of received trades may be performed. Such a determination may include a netting of trades received from asset manager components. For example, using the example set forth above, four orders (Buy €20 M, Buy €50 M, Buy €20 M, and Sell €50 M) may be netted into an imbalance of Buy €40 M by a net market risk module.

At 410, a trade imbalance, or tail, may be calculated. As set forth above, after netting, an imbalance may be determined. In some embodiments, net market risk module may be configured to determine a net imbalance without disclosing such information to outside observers. In this manner, individuals or institutions may be unaware of a total position amount, or an amount of a trade imbalance, which may minimize the opportunity for collusion or manipulation of market rates.

At 412, once a net imbalance has been determined, the net imbalance amount may be communicated to an algorithm engine component, as discussed above with respect to FIG. 1, where the calculated trade imbalance may be automatically executed over a defined time period.

Figure 5:
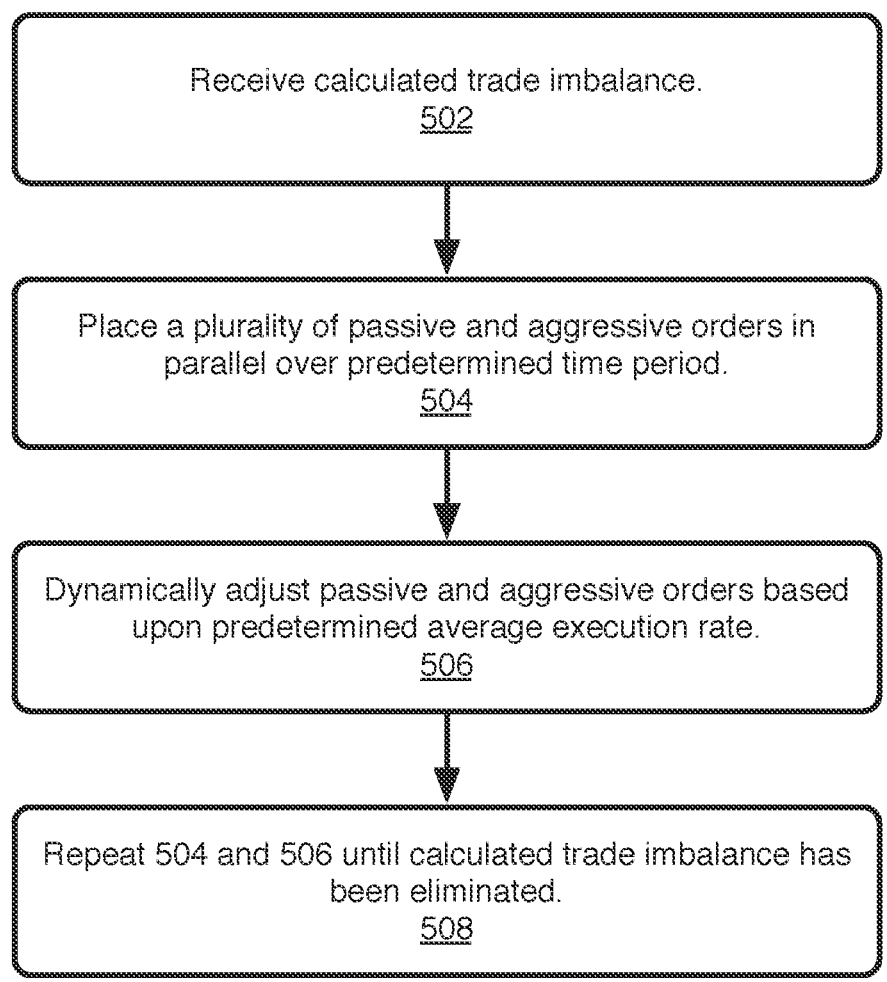
FIG. 5 illustrates a logic flow according to an embodiment.

FIG. 5 illustrates one embodiment of a logic flow 500. The logic flow 500 may be representative of some or all of the operations executed by one or more embodiments described herein. For instance, the logic flow 500 may be representative of some or all of the operations executed by system 100, and the components and modules included therein, for example.

At 502, a calculated trade imbalance may be received by an algorithm engine component. The calculated trade imbalance may be the result of netting operations performed on a plurality of orders.

At 504, a plurality of passive and aggressive orders may be placed in parallel over a defined time period. An algorithm engine component may be configured to place electronic orders to aggresse the market to execute a particular amount in defined time intervals throughout the defined time period for orders. Simultaneously, the algorithm engine component may be configured to place resting orders such that risk is passively executed on the other side of the market spread. In some embodiments, the operations of the algorithm engine component may be repeated substantially in parallel across multiple market venues.

The defined time period for execution of a trade imbalance may be during the defined time period for WM fixing component to fix the WM/Reuters® rate. As described herein, the algorithm engine component may be configured to automatically execute a trade imbalance during the same time period that WM fixing component determines a benchmark rate. In some embodiments, the algorithm engine component may be configured to automatically execute a trade imbalance such that the determination of a benchmark rate by WM fixing component is not materially altered.

At 506, passive and aggressive orders may be dynamically adjusted based upon a defined average execution rate. For example, dependent upon the fill rates on both the passive and aggressive orders returned from the various execution venues, an algorithm engine component may be configured to dynamically manage a ratio of passive hedging throughout an order lifecycle. During execution of a net imbalance, an algorithm engine component may be configured to constrain the amounts being ordered, both passively and aggressively, to ensure an average execution rate does not drift from a TWAP reference price being measured from market data over the defined order time period. During execution, the algorithm engine component may not disclose information regarding the amount of a net imbalance to outside observers. In this manner, individuals or institutions may be unaware of a total position amount, or an amount of a trade imbalance, which may minimize the opportunity for collusion or manipulation of market rates. In some embodiments, a percentage remaining may be displayed. For example, the algorithm engine component may provide a "50%" reading to a display device to indicate that execution of a trade imbalance is half way complete.

At 508, 504 and 506 may be repeated until a calculated trade imbalance has been eliminated or reduced.

Figure 6:
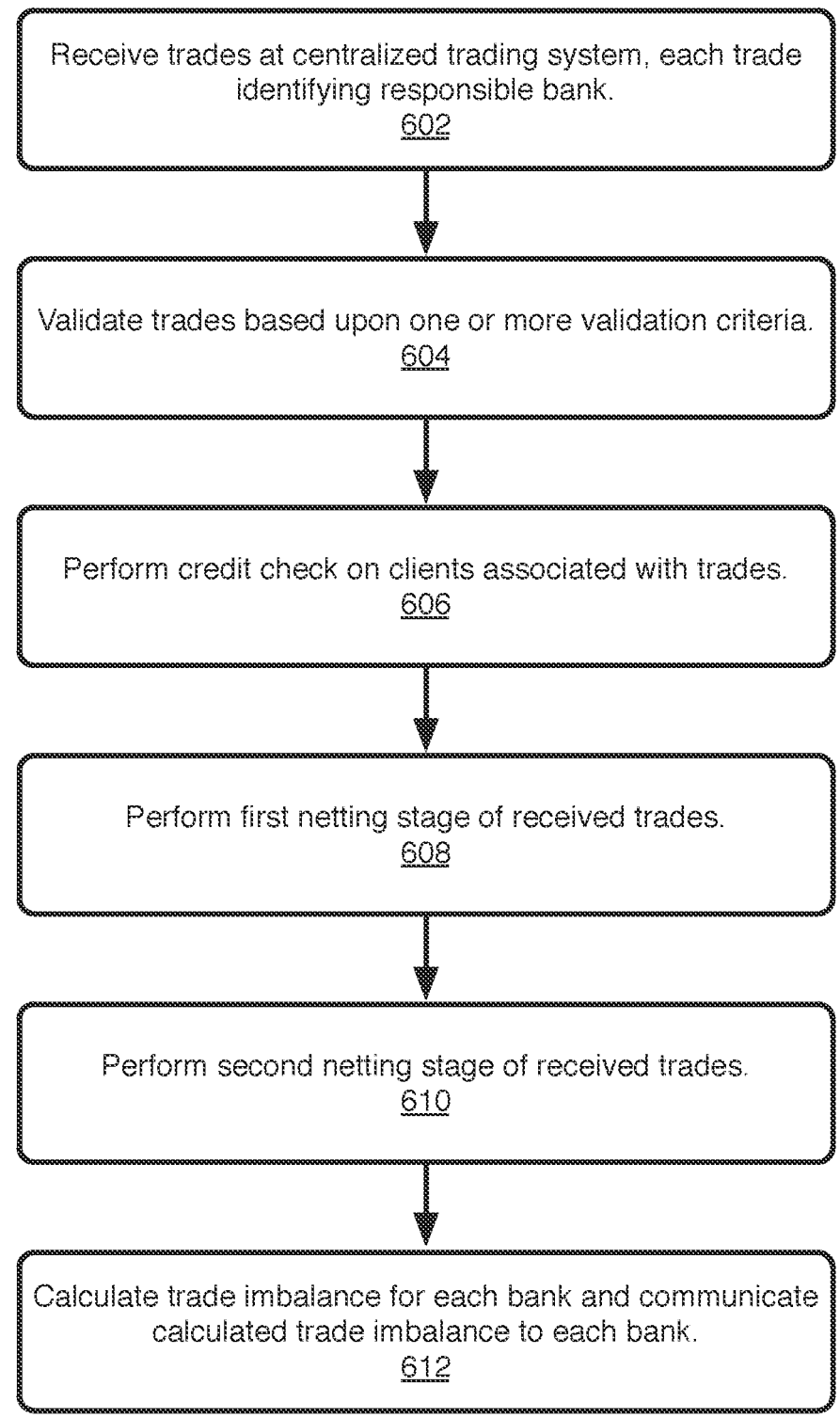
FIG. 6 illustrates a logic flow according to an embodiment.

FIG. 6 illustrates one embodiment of a logic flow 600. The logic flow 600 may be representative of some or all of the operations executed by one or more embodiments described herein. For instance, the logic flow 600 may be representative of some or all of the operations executed by system 300, and the components and modules included therein, for example.

At 602, trades may be received at a centralized trading system. Each trade may identify an associated, or responsible, bank. In an embodiment, an asset manager component may be responsible for one or more trades sent to a centralized server. Each trade may include information regarding a currency amount, benchmark rate, and associated bank.

At 604, the received trades may be validated based upon one or more validation criteria. One or more trade validation modules may be configured to receive orders from asset manager components. Trade validation modules may be configured to confirm one or more validation criteria for each order. In one example, trade validation modules may be configured to determine whether one or more orders have been received within designated timeframe, for example, a defined period of time prior to a benchmark rate being set. Further, trade validation modules may be configured to determine whether each received order includes an eligible currency pair or an eligible counterparty, for example.

At 606, a credit check may be performed on clients associated with the received trades. A credit check module may be configured to perform credit checks for parties associated with orders received at a centralized server. The credit check module may be configured to extract credit information, such as name and tax identification number, from an order and perform a credit check using such information. Credit check modules may utilize an internal credit database, or may communicate with an outside credit database or service using one or more of the communication techniques described herein. In some embodiments, credit check modules may provide an acknowledgement of creditworthiness after a credit check is verified, or may deny an order if a credit check fails. In either case, a response from credit check modules may be sent using one or more communication techniques described herein from the centralized server to one or more asset managers.

At 608, a first netting phase may be performed by a bank netting module. In a first netting phase, orders may be netted in a manner as discussed above with respect to FIG. 3. The bank netting module may perform netting in a bank-specific manner, matching buys and sells by currency pair for a particular bank only. Netting by the bank netting module may be performed during a defined time period prior to a WM/Reuters® rate setting window, which may be defined such that time is available prior to WM/Reuters® rate setting to perform an additional netting phase. Bank netting component may send a calculated trade imbalance to a second phase of netting at bi-lateral credit hub module.

At 610, a second netting phase may be performed on the received trades. A bi-lateral credit hub module may be configured to perform a second phase of netting. The bi-lateral credit-hub module may be multibank, where multiple banks may cross positions at the WM/Reuters® mid-point rate with each other. Unlike the first netting phase, the bi-lateral credit hub may generate actual trades that may need to be settled. Each order's time stamp may determine its position in a matching queue. At a defined time period before the WM/Reuters® rate window, the bi-lateral credit hub may be configured to net down positions utilizing a market liquidity component, which may be similar to market liquidity component 130, discussed above. The actual crossing mechanics may be driven by the timestamp on each order and the established credit lines between each participating bank. In one example, matching may be performed on a first-in-first-matched basis by currency pair. If, however, a particular bank does not have credit lines to execute an otherwise matching order, it may be skipped. To minimize the skipping of banks due to credit and increase the level of netting, the bi-lateral credit hub module may be configured to utilize an enhanced version of bi-lateral credit functionality. The enhanced bi-lateral credit functionality may allow the bi-lateral credit hub to perform several trades to accomplish a match. For example, Bank A may not have credit with Bank C but Bank B may have credit with both Bank A and Bank C. In this case, Bank A may trade with Bank B, and Bank B can trade with Bank C, accomplishing the same netting as when Bank A and Bank C have sufficient credit to trade directly. A bi-lateral credit hub may be configured to automatically determine the available of such trading situations, and may automatically perform such a series of trades to increase the level of available netting.

At 612, a trade imbalance may be calculated after both netting phases have completed. Once both netting phases have been completed, there may be orders remaining that are unmatched, either due to the lack of volume in the opposite direction or lack of credit. Each bank may maintain ownership of their specific orders that were unmatched. A bank netting component may communicate all the matched and unmatched information back to the banks in time for them to manage their own tail risks at the WM/Reuters® rate fix. A centralized system may be configured such that this is the first time that banks become aware of the orders received from asset manager components. In this manner, collusion and manipulation of a benchmark rate may be reduced.

Figure 7:
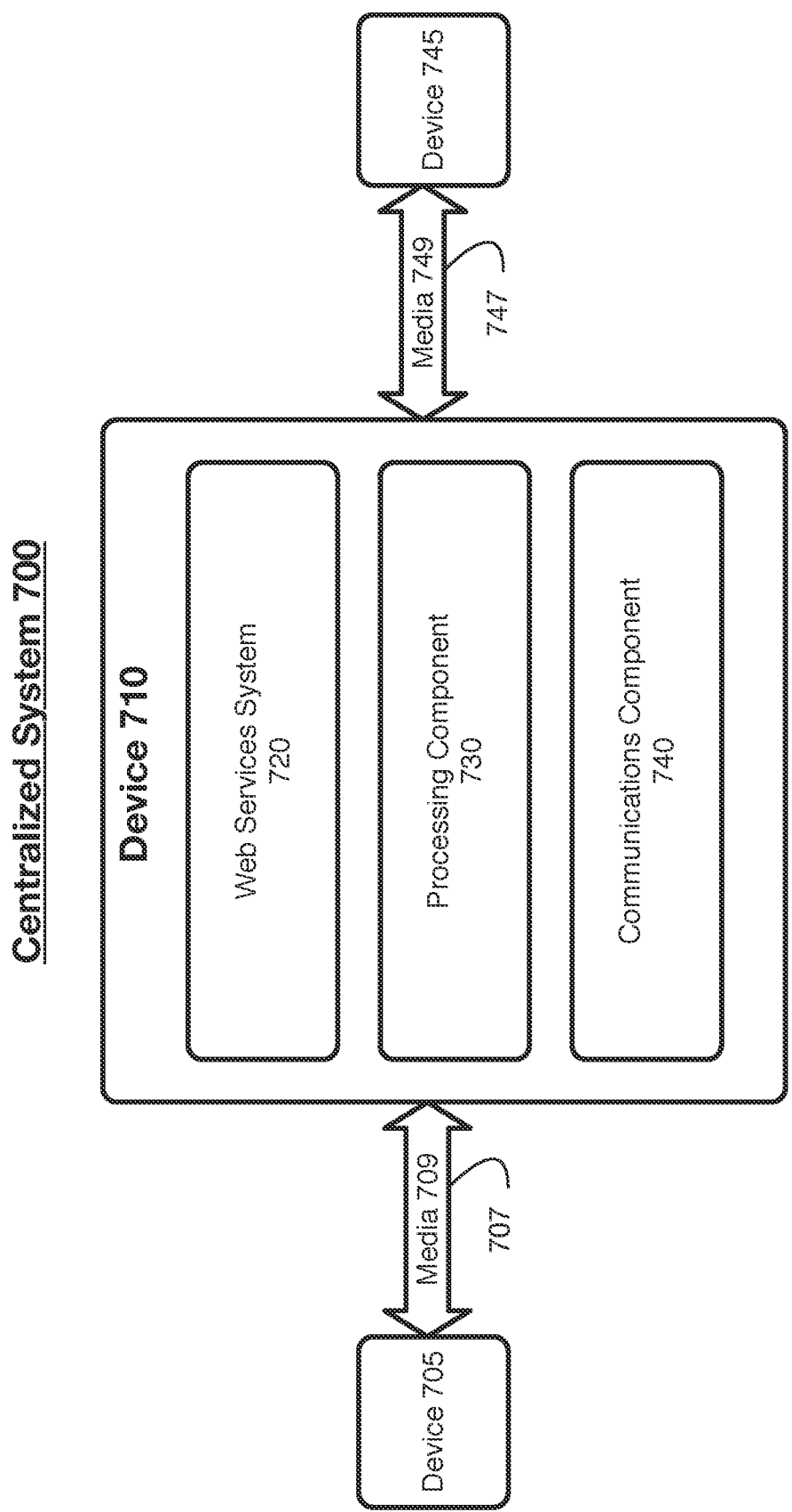
FIG. 7 illustrates an embodiment of a centralized system according to an embodiment.

FIG. 7 illustrates a block diagram of a centralized system 700. The centralized system 700 may implement some or all of the structure and/or operations for the web services system 720 in a single computing entity, such as entirely within a single device 710.

The device 710 may comprise any electronic device capable of receiving, processing, and sending information for the web services system 720. Examples of an electronic device may include without limitation a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. The embodiments are not limited in this context.

The device 710 may execute processing operations or logic for the web services system 720 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 710 may execute communications operations or logic for the web services system 720 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 709, 749 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 710 may communicate with other devices 705, 745 over a communications media 709, 749, respectively, using communications signals 707, 747, respectively, via the communications component 740. The devices 705, 745, may be internal or external to the device 710 as desired for a given implementation. Examples of devices 705, 745 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 705 may correspond to a client device such as a phone used by a user. Signals 707 sent over media 709 may therefore comprise communication between the phone and the web services system 720 in which the phone transmits a request and receives a web page in response.

Device 745 may correspond to a second user device used by a different user from the first user, described above. In one embodiment, device 745 may submit information to the web services system 720 using signals 747 sent over media 749 to construct an invitation to the first user to join the services offered by web services system 720. For example, if web services system 720 comprises a social networking service, the information sent as signals 747 may include a name and contact information for the first user, the contact information including phone number or other information used later by the web services system 720 to recognize an incoming request from the user. In other embodiments, device 745 may correspond to a device used by a different user that is a friend of the first user on a social networking service, the signals 747 including status information, news, images, or other social-networking information that is eventually transmitted to device 705 for viewing by the first user as part of the social networking functionality of the web services system 720.

Figure 8:
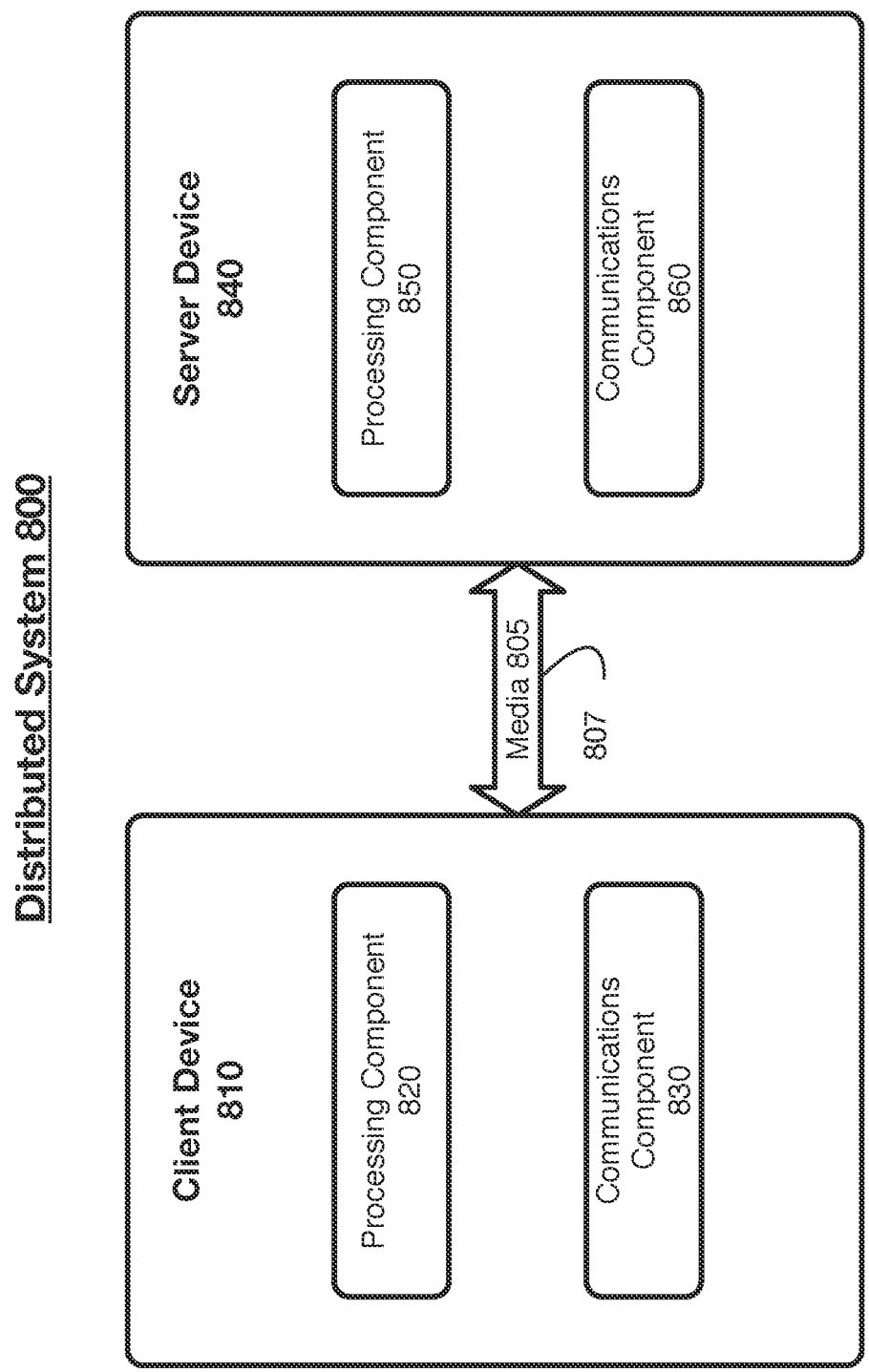
FIG. 8 illustrates an embodiment of a distributed system according to an embodiment.

FIG. 8 illustrates a block diagram of a distributed system 800. The distributed system 800 may distribute portions of the structure and/or operations for the disclosed embodiments across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 810 and a server device 840. In general, the client device 810 and the server device 840 may be the same or similar to device 710 as described with reference to FIG. 7. For instance, the client device 810 and the server device 840 may each comprise a processing component 820, 850 and a communications component 830, 860 which are the same or similar to the processing component 730 and the communications component 740, respectively, as described with reference to FIG. 7. In another example, the devices 810 and 840 may communicate over a communications media 805 using media 805 via signals 807.

The client device 810 may comprise or employ one or more client programs that operate to perform various methodologies in accordance with the described embodiments. In one embodiment, for example, the client device 810 may implement some steps described with respect client devices described in the preceding figures.

Figure 9:
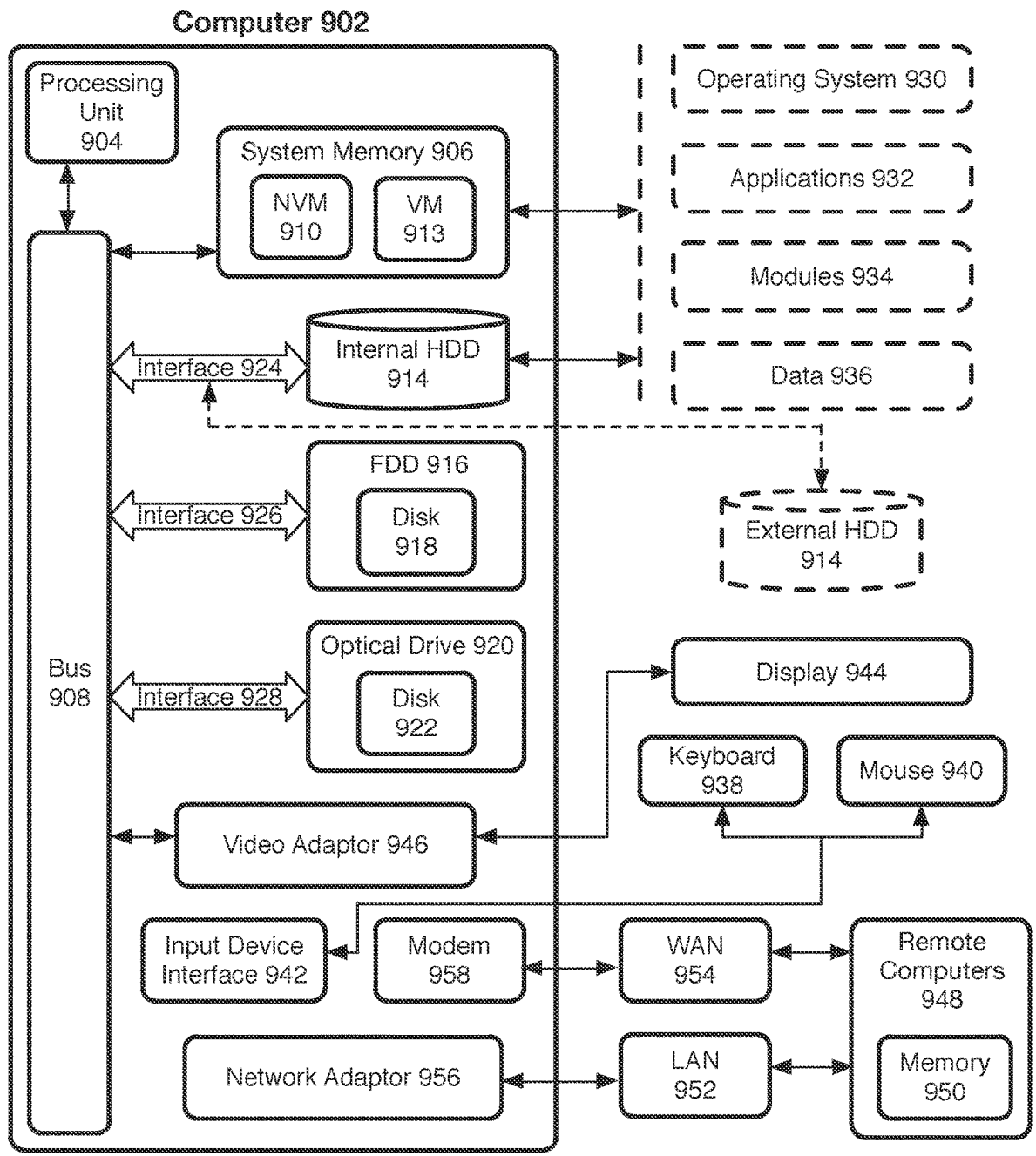
FIG. 9 illustrates an embodiment of a computing architecture.

The server device 840 may comprise or employ one or more server programs that operate to perform various methodologies in accordance with the described embodiments. In one embodiment, for example, the server device 840 may implement some steps described with respect to server devices described in the preceding figures FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel®

Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 913. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM, DVD, or Blu-ray). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 913, including an operating system 930, one or more application programs 932, other program modules 934, and program data 936. In one embodiment, the one or more application programs 932, other program modules 934, and program data 936 can include, for example, the various applications and/or components to implement the disclosed embodiments.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A display 944 is also connected to the system bus 908 via an interface, such as a video adaptor 946. The display 944 may be internal or external to the computer 902. In addition to the display 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
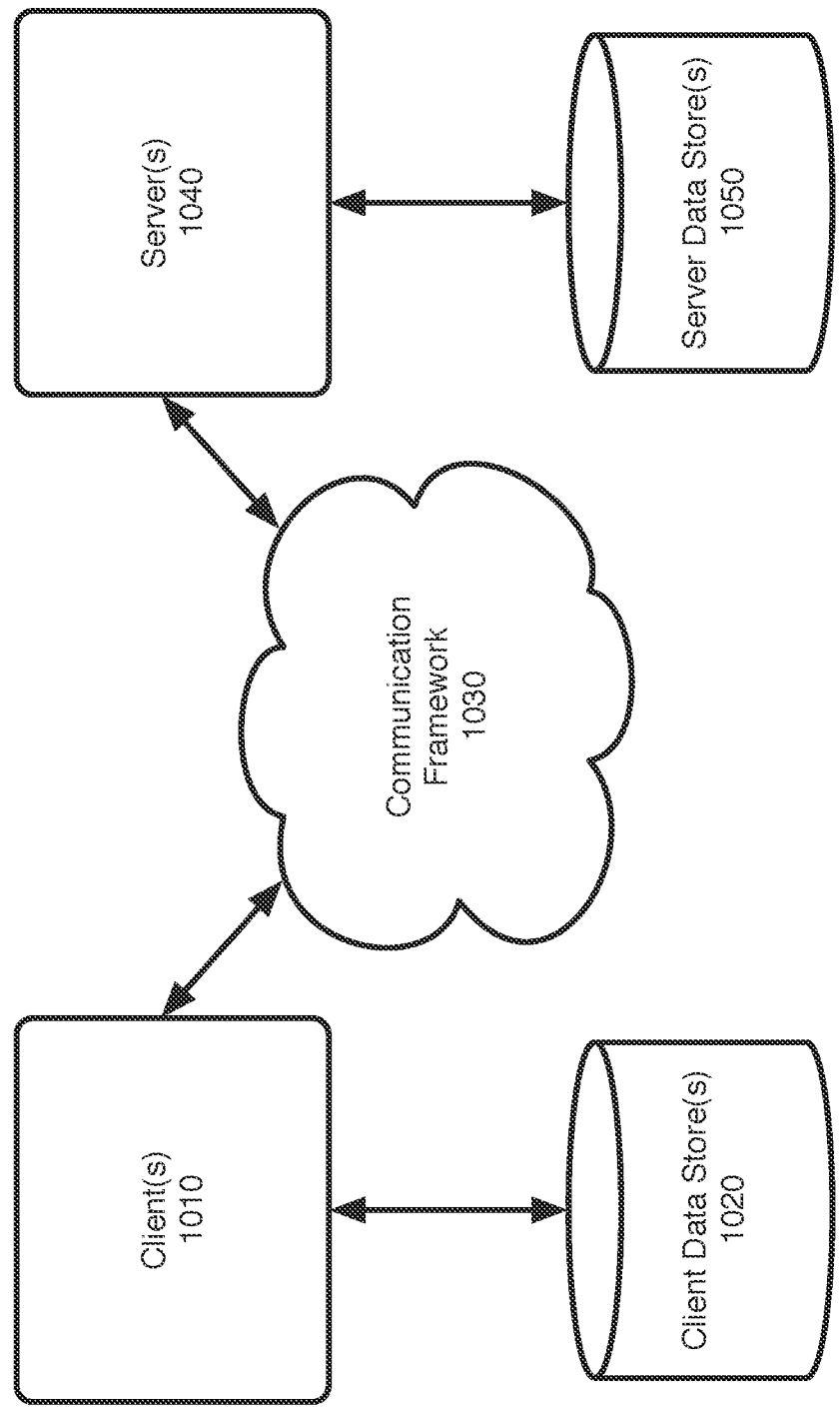
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1010 and servers 1040. The clients 1010 may implement the client device 810, for example. The servers 1040 may implement the server device 840, for example. The clients 1010 and the servers 1040 are operatively connected to one or more respective client data stores 1020 and server data stores 1050 that can be employed to store information local to the respective clients 1010 and servers 1040, such as cookies and/or associated contextual information.

The clients 1010 and the servers 1040 may communicate information between each other using a communication framework 1030. The communications framework 1030 may implement any well-known communications techniques and protocols. The communications framework 1030 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1030 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1010 and the servers 1040. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. A system, comprising:
    a non-transitory computer-readable storage medium; and
    one or more processors coupled with the non-transitory computer-readable storage to perform operations, the operations to:
        store, by the one or more processors, a trade imbalance in the non-transitory computer-readable storage securely to prevent access by outside observers;
        automatically execute, by the one or more processors, the trade imbalance over a defined period of time, wherein access to the trade imbalance is prevented to outside observers, the execution of the trade imbalance to perform operations to:
        place a plurality of passive and aggressive orders substantially in parallel over the defined period of time,
        dynamically adjust a rate of passive and aggressive orders based upon a defined average execution rate,
        repeatedly place a plurality of passive and aggressive orders substantially in parallel over the defined period of time and dynamically adjust the rate of passive and aggressive orders based upon the defined average execution rate until the calculated trade imbalance has been reduce to a defined amount; and
        storing one or more executed trades in the non-transitory computer-readable storage medium.

2. The system of claim 1, wherein the trade imbalance comprises a result of netting operations performed on a plurality of orders.

3. The system of claim 1, the plurality of passive and aggressive orders repeatedly placed substantially in parallel across multiple market venues.

4. The system of claim 1, the operations to further determine the WM/Reuters® rate over the defined period of time.

5. The system of claim 1, the operations to further determine the benchmark rate over the defined period of time.

6. The system of claim 1, wherein operations to repeatedly place the plurality of passive and aggressive orders comprise operations to dynamically manage a ratio of passive hedging throughout an order lifecycle dependent upon fill rates on both the passive and aggressive orders returned from various execution venues.

7. The system of claim 1, wherein operations to repeatedly place the plurality of passive and aggressive orders further comprise operations to constrain amounts being ordered, both passively and aggressively, to ensure that the average execution rate does not drift from a time-weighted average price (TWAP) reference price being measured from market data over the defined period of time.

8. The system of claim 1, wherein operations to repeatedly place the plurality of passive and aggressive orders do not disclose information regarding the amount of a net imbalance to outside observers.

9. The system of claim 1, wherein operations to repeatedly place the plurality of passive and aggressive orders comprise operations to provide a "50%" reading to a display device to indicate that execution of a trade imbalance is half way complete.

10. The system of claim 1, wherein operations further comprise operations to store order information in a secure manner such that the order information is unavailable to outside observers.

11. An article including a non-transitory computer-readable storage medium including instructions, that, when executed by a processor-based system, cause the processor-based system to perform operations, the operations to:
    store, by the processor-based system, a trade imbalance in memory securely to prevent access by outside observers;
    automatically execute, by the processor-based system, the trade imbalance over a defined period of time, wherein access to the trade imbalance is prevented to outside observers, wherein execution of the trade imbalance comprises:
    place a plurality of passive and aggressive orders substantially in parallel over the defined period of time,
    dynamically adjust a rate of passive and aggressive orders based upon a defined average execution rate,
    repeatedly place a plurality of passive and aggressive orders substantially in parallel over the defined period of time and dynamically adjust the rate of passive and aggressive orders based upon the defined average execution rate until the calculated trade imbalance has been reduce to a defined amount; and
    store one or more executed trades in the memory.

12. The article of claim 11, wherein the trade imbalance comprises a result of netting operations performed on a plurality of orders.

13. The article of claim 11, the plurality of passive and aggressive orders repeatedly placed substantially in parallel across multiple market venues.

14. The article of claim 11, the operations to further determine the benchmark rate over the defined period of time.

15. The article of claim 11, wherein operations to repeatedly place the plurality of passive and aggressive orders comprise operations to dynamically manage a ratio of passive hedging throughout an order lifecycle dependent upon fill rates on both the passive and aggressive orders returned from various execution venues.

16. The article of claim 11, wherein operations to repeatedly place the plurality of passive and aggressive orders further comprise operations to constrain amounts being ordered, both passively and aggressively, to ensure an average execution rate does not drift from a time-weighted average price (TWAP) reference price being measured from market data over the defined period of time.

17. A computer-implemented method, comprising:
   storing, by one or more processors, a trade imbalance in a non-transitory computer-readable storage securely to prevent access by outside observers;
   automatically executing, by the one or more processors, the trade imbalance over a defined period of time, wherein access to the trade imbalance is prevented to outside observers, and wherein the executing the trade imbalance comprises:
   placing a plurality of passive and aggressive orders substantially in parallel over the defined period of time, dynamically adjusting a rate of passive and aggressive orders based upon a defined average execution rate,
   repeatedly placing a plurality of passive and aggressive orders substantially in parallel over the defined period of time and dynamically adjusting the rate of passive and aggressive orders based upon the defined average execution rate until the calculated trade imbalance has been reduce to a defined amount; and
   storing one or more executed trades in the non-transitory computer-readable storage medium.

18. The computer-implemented method of claim 17, wherein repeatedly placing the plurality of passive and aggressive orders does not disclose information regarding the amount of a net imbalance to outside observers.

19. The computer-implemented method of claim 17, further comprising storing order information in a secure manner such that the order information is unavailable to outside observers.

20. The computer-implemented method of claim 17, wherein the trade imbalance comprises a result of netting operations performed on a plurality of orders.

21. The computer-implemented method of claim 17, the plurality of passive and aggressive orders repeatedly placed substantially in parallel across multiple market venues.

\* \* \* \* \*